United States Patent [19]

Sugawara et al.

[11] Patent Number: 4,948,093

[45] Date of Patent: Aug. 14, 1990

[54] SOLENOID VALVE

[75] Inventors: Toshimitsu Sugawara, Hanamaki; Takeshi Iinuma, Iwate; Tadashi Suzuki, Morioka, all of Japan

[73] Assignee: Tohoku Mikuni Kogyo Kabushiki Kaisha, Iwate, Japan

[21] Appl. No.: 417,081

[22] Filed: Oct. 4, 1989

[51] Int. Cl.[5] .............................................. F16K 31/06

[52] U.S. Cl. .......................... 251/129.15; 251/129.09; 251/129.1

[58] Field of Search ...................... 251/129.15, 129.22, 251/129.09, 129.1

[56] References Cited

U.S. PATENT DOCUMENTS 4,792,114 12/1988 Fornuto et al. ............ 251/129.15 X 4,883,252 11/1989 Mesenich .................... 251/129.22 X

FOREIGN PATENT DOCUMENTS 64-17075 1/1989 Japan .

*Primary Examiner*—Arnold Rosenthal

*Attorney, Agent, or Firm*—Wells & White

[57] ABSTRACT

A solenoid valve including a solenoid and a second solenoid to which a smaller electric current is applied han is applied to the first solenoid. The first solenoid is provided at a core, and the second solenoid is provided at a support member connected to the core. A cup-shaped plunger is connected to a valve body opening and closing a passage, and is moved in accordance with an energization of the solenoid, to open and close the valve body. A contact member is connected to the plunger and inclined relative to the bottom wall of the plunger, to come into tight contact with the support member. A first magnetic path is formed in the core and a cylindrical side wall of the plunger, and a second magnetic path is formed in the support member and the contact member.

11 Claims, 4 Drawing Sheets

SOLENOID VALVE

BACKGROUND OF THE INVENTION

1. Field of the Invention

The present invention relates to a solenoid valve for opening and closing a passage to allow or stop a flow of fuel gas to a domestic gas device such as gas water heater.

2. Description of the Related Art

The amount of an electric current applied to a solenoid of a solenoid valve when the solenoid valve is kept open is smaller than the amount applied when the solenoid valve is to be open when closed. Nevertheless, even when the solenoid valve is kept open, if magnetic leak occurs from a gap between an armature and a core energized when an electric current is applied to the solenoid, the amount of the electric current needed to keep the solenoid valve open is larger than desirable.

In Japanese Unexamined Utility Model Publication No. 64-17075, one of the present inventors proposed a solenoid valve having an additional solenoid, i.e., in addition to a usual solenoid, for producing a magnetic flux in a fully closed magnetic path so that only a small electric current is needed to keep the solenoid valve open.

FIGS. 1 and 2 show a construction of the proposed solenoid valve. In the drawings, a core 10 made of a usual magnetic soft-alloy has a column portion 11, a flange portion 12 formed at one end of the column portion 11, and a support portion 13 formed at the other end of the column portion 11. A first solenoid 14 is provided adjacent to the column portion 11, and a second solenoid 15 is located in an annular groove 16 formed on an outer end face of the support portion 13. A guide rod 17 is connected to the center of a bottom wall 21 of a cup-shaped plunger or armature 20 by a solder 19, and inserted in a guide hole 18 formed in the axial portion of the core 10 to be slidably supported therein.

A valve body 25 is provided at the end portion of the guide rod 17, and is urged by a spring 26 in a direction in which the valve body 25 closes a passage (not shown). As shown in FIG. 1, an electric current is applied to the solenoids 14 and 15 so that the plunger 20 is attracted by the core 10, and thus the valve body 25 is opened against the force of a spring 26. Namely, an inner face of the bottom wall 21 comes into contact with an outer end face of the support portion 13, and thus an annular space 22 is formed between a lower end peripheral portion 23 and the flange portion 12.

The solenoid valve is operated as follows. When the valve body 25 is positioned upward in the drawings, i.e., has closed the passage, an inner face of the bottom wall 21 is separated from an end face of the support portion 13, and the lower end peripheral portion 23 of the plunger 20 and the flange portion 12 are separated from each other by a wide gap. Therefore, to open the valve body 25, a large electric current must be applied to the first solenoid 14, so that the plunger 20 is attracted to the core 10, and after the valve body 25 is opened, a small electric current applied to the second solenoid 15 to keep the valve body 25 open, and the application of electric current to the first solenoid 14 stopped. Namely, the valve body 25 is kept open by the small electric current. An electric current may be applied to the first and second solenoids 14 and 15 at the same time, to open the valve, and after the valve body 25 is opened, the application of electric current to the first solenoid 14 may be stopped. Accordingly, since magnetic path generated by applying an electric current to the second solenoid 15 is formed as a fully closed magnetic circuit, through the bottom wall 21 and the support portion 13, the amount of electric current to be applied to the second solenoid 15 to keep the valve body 25 open is reduced.

The solenoid valve having the above construction, however, has the following problems.

If the guide rod 17 is fixed to the plunger 20 by the solder 19 in such a manner that the guide rod is inclined to the axis of the plunger 20, as shown in FIG. 2, the entire surface of the inner face of the bottom wall 21 does not come into contact with the end face of the support portion 13, and as a result, after the valve is open, a large amount of the electric current must be applied to the second solenoid 15 to keep the valve open. Similarly, if an attracting force generated at the lower end peripheral portion 23 to attract the peripheral portion 23 to the center of the core 10 is not balanced along the entire periphery of the portion 23, the solder 19 may be elastically deformed and the plunger 20 hereby inclined against the guide rod 17, so that the entire furface of the inner face of the bottom wall 21 does not come into contact with the end face of the support portion 13.

Further, if an attracting force generated at the lower end peripheral portion 23 to attract the portion 23 to the center of the core 10 is not balanced along the entire periphery of the portion 23, the guide rod 17 may be inclined toward the guide hole 18, whereby the lower end of the rod 17 comes into contact with the inner wall of the guide hole 18, and as a result, the guide rod 17 is not smoothly guided by the guide hole 18 and a smooth movement of the plunger 20 is not obtained. Also, if the plunger 20 is inclined due to the unbalanced force, so that a part of the portion 23 is in contact with the flange portion 12, the downward movement of the plunger 20 is obstructed.

Both the magnetic flux 28 generated by applying an electric current to the first solenoid 14 and the magnetic flux 29 generated by applying an electric current to the second solenoid 15 pass through the bottom wall 21, and when the valve is opened from a closed state, a high electric current having a high magnetization intensity is applied to the first solenoid 14. Therefore, due to a remanence existing on the bottom wall 21 after shutting off the electric current, the plunger 20 is attracted to the core 10 even after the electric current applied to the second solenoid 15 is shut off, whereby the opening movement of the valve is delayed.

This delay is also caused by a remanence of the bottom wall 21 generated by applying an electric current to the second solenoid 15.

SUMMARY OF THE INVENTION

Therefore, the object of the present invention is to provide a solenoid valve by which the amount of an electric current applied to the second solenoid for keeping the valve open is less than that needed for a conventional valve.

Another object of the present invention is to provide a solenoid valve in which the plunger moves smoothly up and down relative to the core.

A further object of the present invention is to provide a solenoid valve by which the valve is closed from an open state substantially without delay.

According to the present invention, the solenoid valve comprises a valve body for opening and closing a passage, a housing, a plunger movably housed in the housing and connected to the valve body to move the valve body to open and close the passage, a core located in the plunger and provided with a first solenoid, a support member connected to the core and positioned near a bottom wall of the plunger, a contact member located in the plunger and connected to the plunger and able to be inclined relative to the bottom wall in such a manner that the contact member is able to come into tight contact with the support member, and a spacer provided between the plunger and the contact member to form a space therebetween.

The plunger is cup-shaped and has a bottom wall and a cylindrical side wall. The core and the cylindrical side wall of the plunger form a first magnetic path. The support member is provided with a second solenoid to which a lower electric current is applied than that applied to the first solenoid. The contact member and the support member form a second magnetic path.

Preferably, the housing is provided with annular ribs formed on an inner wall thereof, so that an outer surface of the cylindrical side wall of the plunger is guided by the annular ribs to ensure that the plunger moves along the central axis thereof.

The contact member and/or the support member may be made of a magnetic material having a small remanence, such as a permalloy.

BRIEF DESCRIPTION OF THE DRAWINGS

The present invention will be better understood from the description of the preferred embodiments of the invention set forth below, together with the accompanying drawings, in which.

DESCRIPTION OF THE PREFERRED EMBODIMENTS

Figure 1:
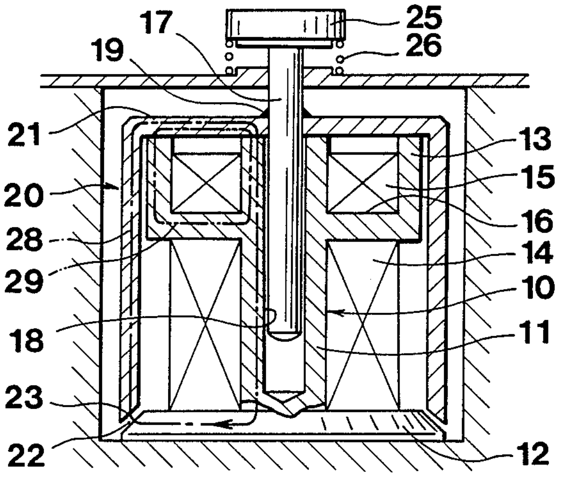
FIG. 1 (PRIOR ART)
FIG. 1 shows a sectional view of a solenoid valve of a prior art.

The present invention will now be described with reference to embodiments shown in the drawings.

Figure 2:
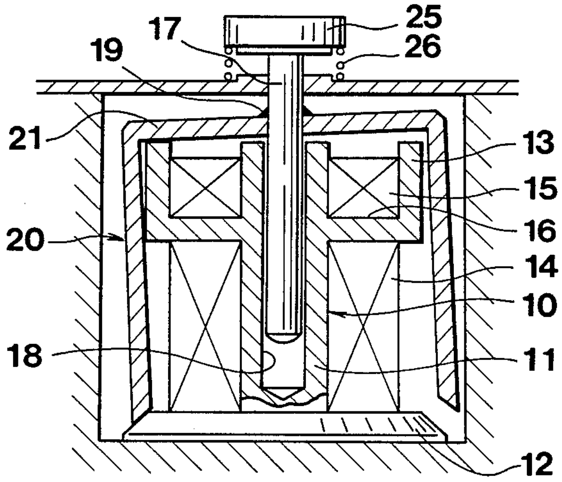
FIG. 2 (PRIOR ART)
FIG. 2 shows a sectional view of the solenoid valve in FIG. 1, in a state in which the plunger is inclined to the guide rod.
Figure 3:
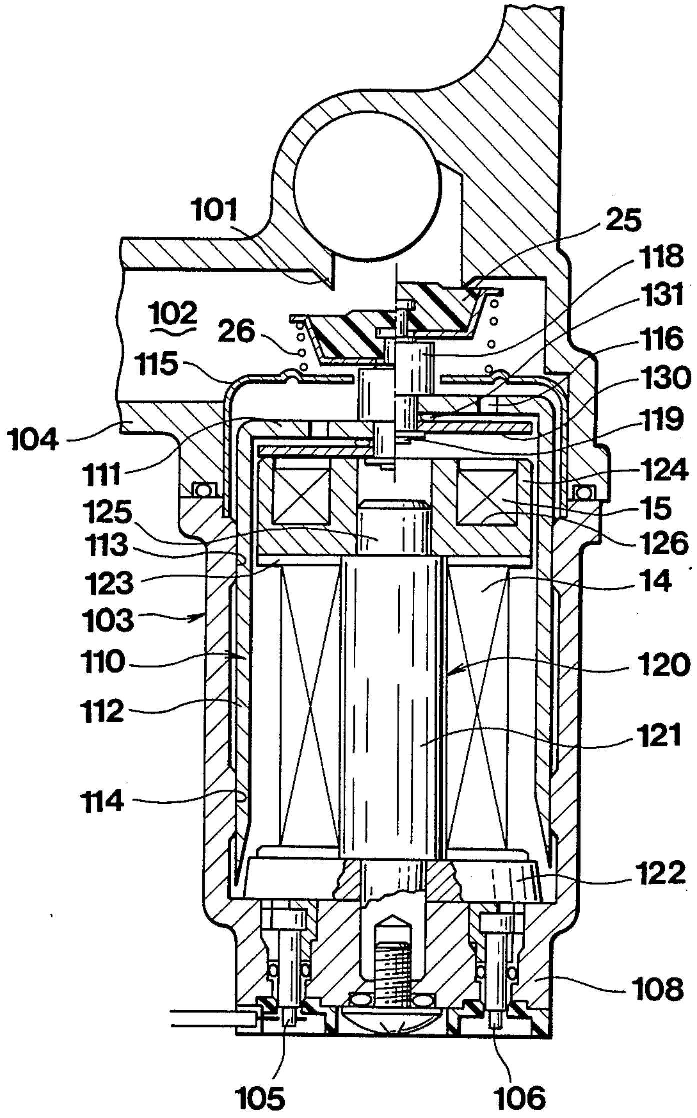
FIG. 3 shows a sectional view of a first embodiment of the present invention.
Figure 4:
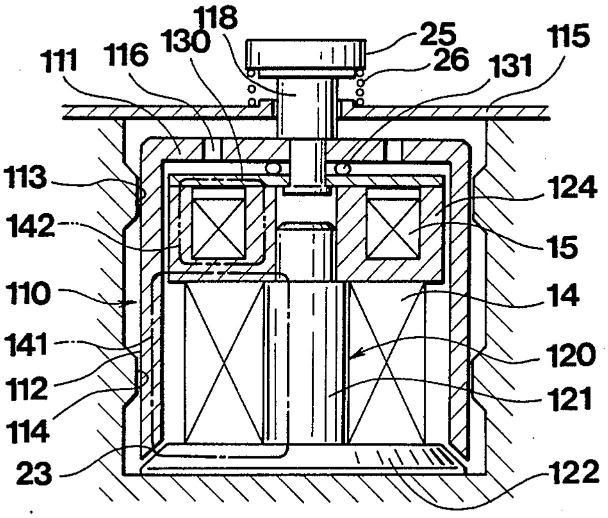
FIG. 4 shows a sectional view of a main part of the first embodiment.
Figure 5:
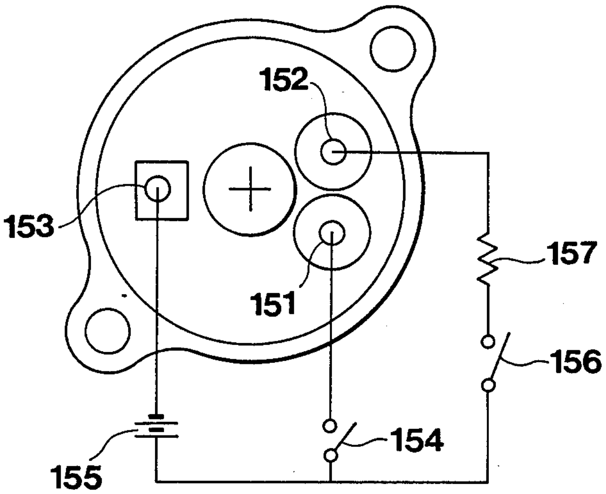
FIG. 5 shows an electric circuit including the first and second solenoids of the first embodiment; and present invention.

FIGS. 3 through 5 show a first embodiment of the solenoid valve according to the present invention. In these drawings, the same parts as shown FIGS. 1 and 2 are given the same reference numerals.

In FIGS. 3 and 4, a valve body 25 moves up and down to come into contact with and separate from an annular valve seat 101, to open and close a passage 102 through which a fluid such as fuel gas passes. A housing 103 of the solenoid valve is fixed to a body 104 in which the passage 102 is formed. The solenoid valve is provided with a first solenoid 14 and a second solenoid 15, the terminals 105 and 106 of which project from the bottom 108 of the housing 103 and are connected to a electric circuit shown in FIG. 5

A plunger 110 is cup-shaped and has a bottom wall 111 and a cylindrical side wall 112, and is movably housed in the housing 103. The plunger 110 is positioned in such a manner that the bottom wall 111 is close to the body 104, and is slidably supported by two annular ribs 113, 114 formed on an inner wall of the housing 103 so that the plunger 110 is guided to move along the central axis thereof. Note if the plunger 110 was guided by the whole inner surface of the housing 103, a frictional resistance between the plunger 110 and the housing 103 would be too high. Therefore, in this embodiment, the plunger 110 is guided only by the two annular ribs 113, 114, although this embodiment is not limited thereto.

The housing 103 is provided with a cover 115 forming a barrier between the passage 102 and the housing 103. The valve body 25 is connected to the bottom wall 111 through a connecting rod 118 extending through the cover 115, and thus the valve body 25 and the plunger 110 are moved up and down as one body. A spring 26 is disposed between the cover 115 and the valve body 25, to urge the valve body 25 into tight contact with the seat 101 to close the passage 102. The bottom wall 111 is provided with holes 116 through which air passes between the inside and outside of the plunger 110.

As described later, when an electric current is not applied to the solenoids 14 and 15, the plunger 110 is urged upward by the spring 26 so that the valve body 25 closes the passage 102. This state is shown in the right half of FIG. 3. Conversely, when an electric current is applied to the solenoid 14, the plunger 110 is attracted by a core 120 to move downward against the spring 26 and open the passage 102. This state is shown the left half of FIG. 3.

The core 120 is located in the plunger 110, and is provided with a column portion 121, a flange portion 122 and a large diameter portion 123. The first solenoid 14 is provided on the column portion 121, and positioned between the flange portion 122 and the large diameter portion 123. A support member 124 is fitted to a tip portion 125 of the column portion 121 and connected to the large diameter portion 123 of the column portion 121. The support member annular groove 126 into which the second solenoid 15 is fitted.

A lower end 119 of the connecting rod 118 projects from the bottom wall 111 and is connected to a contact member 130. Namely, the contact member 130 is located in the plunger 110 and faces an outer end surface of the support member 124. The contact member 130 is a plate or disk and is connected to the lower end 119 in such a manner that the contact member 130 can be inclined relative to the bottom wall 111, whereby the contact member 130 can come into contact with the outer surface of the support member 124. A spacer 131 is provided between the bottom wall 111 and the contact member 130, so that a space is formed between the bottom wall 111 and the contact member 130. The spacer 131 is made of a non-magnetic and elastic material such as a rubber washer or an O-ring, so that the contact member 130 is magnetically isolated from the plunger 110. The spacer 131 may be a coil spring made of a non-magnetic material. The lower end 119 is caulked to connect the contact member 130 to the connecting rod 118 in such a manner that the spacer 131 is slightly compressed.

The support member 124 and the contact member 130 are made of a magnetic material having a small remanence, such as a permalloy, and the core 120 is made of a usual magnetic soft-iron. As shown in FIG. 4, the core 130 and the cylindrical side wall 112 form a first magnetic path 141, and the support member 124 and the contact member 130 form a second magnetic path 142.

As shown in FIG. 5, a terminal 151 is connected to the first solenoid 14, a terminal 152 is connected to the second solenoid 15, and a terminal 153 is commonly connected to both solenoids 14 and 15. A switch 154 opens and closes a circuit including the first solenoid 14 and an electric source 155, such as a dry battery, and a switch 156 opens and closes a circuit including the second solenoid 15 and the electric source 155. A resistance 157 is provided in the circuit of the second solenoid 15 to reduce an electric current applied to the second solenoid 15, and therefore, a lower electric current is applied to the second solenoid 15 than to the first solenoid 14.

The solenoid valve of the first embodiment is operated as follows.

When an electric current is not supplied to the first and second solenoids 14 and 15, respectively, the valve body 25 is urged by the spring 26 to the upper position as shown in the right half of FIG. 1, to thereby close the passage 102. When the valve body 25 is to be opened, an electric current is applied to the first and second solenoids 14 and 15, whereby magnetic fluxes are formed around the first and second solenoids 14 and 15, and thus the plunger 110 is attracted to the core 120 and moved downward. As a result, the contact member 130 comes into tight contact with the end surface of the support member 124, i.e., no gap appears between the contact member 130 and the support member 124, and at the same time, the valve body 25 is moved downward to open the passage 102.

After this opening operation, the electric current applied to the first solenoid 14 is stopped, and an electric current is applied to only the second solenoid 15 to keep the valve body 25 open. In this state, since the contact member 130 is in tight contact with the support member 124, there is no leakage of the magnetic flux from the contact member 130 and the support member 124, and thus only a small amount of electric current need be applied to the second solenoid 15 to keep the valve body 25 open, in comparison with the current applied to a conventional solenoid valve.

If the electric current applied to the second solenoid 15 is stopped, the valve body 25 and the plunger 110 are urged upward by the spring 26, so that the valve body 25 comes into contact with the valve seat 101 to thereby close the passage 102. In this closing operation, since the support member 124 and the contact member 130 are made of magnetic materials having a small remanence, after the electric current to the second solenoid 15 is stopped, the magnetic flux generated by applying the electric current to the second solenoid 15 immediately disappears, and thus the closing operation is promptly carried out. Further, since the contact member 130 and the inner surface of the bottom wall 111 are separated by a non-magnetic material, the outer surface of the support member 124 and the inner surface of the plunger 110 are separated from each other, so that the first magnetic path 141 generated by applying an electric current to the first solenoid 14 is formed only in the column portion 121, the flange portion 122, the side wall 112, and an end portion of the support member 124 close to the first solenoid 14. Namely, the first magnetic path 141 is formed neither in the contact member 130 nor the bottom wall 111, and accordingly, the closing operation of the valve body 25 is not delayed due to a remanence of a magnetic flux.

In the opening and closing of the valve body 25, i.e., in the up and down movement of the plunger 110, the outer surface of the plunger 110 is slidably guided by the annular ribs 113 and 114, which are guides formed on the inner surface of the housing 103. Therefore, the plunger 110 is not inclined relative to the core 120 due to an unbalance of an attracting force acting on the periphery of the lower end portion 23 near the core 120, for example, so that the plunger 110 moves smoothly up and down along the axis thereof, and thus the valve body 25 smoothly opens and closes the passage 102. Further, the embodiment does not have a long guide rod inserted in a hole formed in the core 120, as in the prior art, and thus the problem of interference between the guide rod and an inner wall of the hole does not arise.

Since the spacer 118 having an elasticity and made of a non-magnetic material is provided between the bottom wall 111 and the contact member 130, when the valve body 25 is open, shock generated by a contact between the contact member 130 and the support member 124 is reduced.

As shown above, although the whole of the core 120 is made of a magnetic material having a small remanence, the problem generated by the remanence is solved. Nevertheless, the magnetic material having a small remanence is expensive, and thus the solenoid valve is expensive. Conversely, according to the embodiment of the present invention, not the core 120 but the support member 124 is made of such a material, and thus the cost of the valve is lowered.

Figure 6:
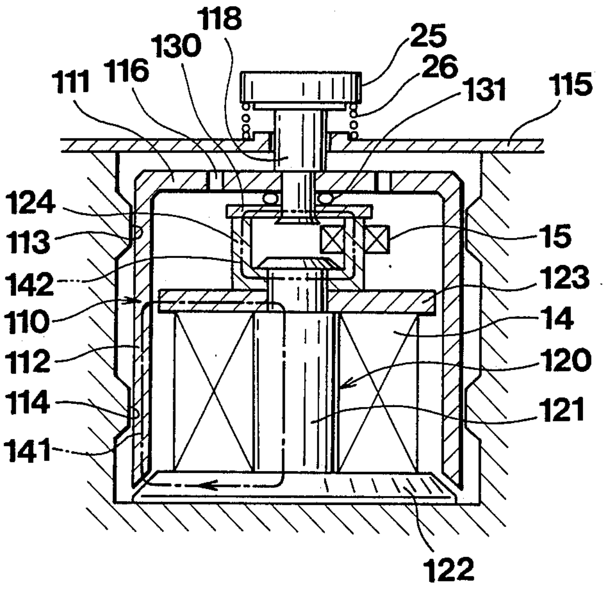
FIG. 6 shows a sectional view of a second embodiment of the present invention.

FIG. 6 shows a second embodiment of the present invention. In this embodiment, the support member 124 is a U-shaped member and is made of a magnetic material having a small remanence, such as a permalloy. The support member 124 is fitted to the end of the column portion 121 of the core 120 and fixed to the large diameter portion 123, and the second solenoid 15 is wound around the support member 124. The remaining construction is the same as that of the first embodiment shown in FIGS. 3 through 5.

In the second embodiment, the operation of the solenoid valve is basically the same as that of the first embodiment, and the effect provided by each member of the solenoid valve is the same as that in the first embodiment. Namely, the plunger 110 is guided by the annular ribs 113 and 114 to be moved smoothly up and down, and the valve body 25 promptly closes the passage 102 due to a low remanence. Further, when the valve body 25 is kept open, the amount of electric current applied is smaller than that in the prior art because the contact member 130 is in tight contact with the support member 124. Still further, when the contact member 130 comes into contact with the U-shaped support member 124, shock occurring due to this contact is softened by the elastic spacer 131.

Although the embodiments of the present invention have been described herein with reference to the accompanying drawings, obviously many modifications and changes may be made by those skilled in this art without departing from the scope of the invention.

What is claimed:

1. A solenoid valve comprising;

a valve body for opening and closing a passage;

a housing;

a plunger movably housed in said housing and connected to said valve body to move said valve body to open and close said passage, said plunger being cup-shaped and having a bottom wall and a cylindrical side wall;

a core located in said plunger and provided with a first solenoid, said core and said cylindrical side wall forming a first magnetic path;

a support member connected to said core and positioned near to said bottom wall, said support member being provided with a second solenoid to which a lower electric current is applied than is applied to said first solenoid;

a contact member located in said plunger and connected to said plunger and able to be inclined relative to said bottom wall, said contact member being able to come into tight contact with said support member, and said contact member and said support member forming a second magnetic path; and a spacer provided between said plunger and said contact member to from a space therebetween.

2. A solenoid valve according to claim 1, wherein said contact member is made of a magnetic material having a small remanence, such as a permalloy.

3. A solenoid valve according to claim 1, wherein said contact member is a plate.

4. A solenoid valve according to claim 1, wherein said spacer is made of a non-magnetic material.

5. A solenoid valve according to claim 1, wherein said spacer is made of an elastic material.

6. A solenoid valve according to claim 1, wherein said support member is provided with an annular groove into which said second solenoid is fitted.

7. A solenoid valve according to claim 1, wherein said support member is a U-shaped member around which said second solenoid is wound.

8. A solenoid valve according to claim 6, wherein said support member is made of a magnetic material having a small remanence, such as a permalloy, and said core is made of a magnetic soft-iron.

9. A solenoid valve according to claim 1, wherein said housing is provided with a means for guiding an outer surface of said cylindrical side wall of said plunger in such a manner that said plunger moves along the central axis thereof.

10. A solenoid valve according to claim 9, wherein said guiding means has two annular ribs separately formed on an inner wall of said housing.

11. A solenoid valve according to claim 7, wherein said support member is made of a magnetic material having a small remanence, such as a permalloy, and said core is made of a magnetic soft-iron.

* * * * *